US012724900B2

(12) United States Patent
Lee et al.

(10) Patent No.: US 12,724,900 B2
(45) Date of Patent: Sep. 1, 2026

(54) DEVICE RISK-BASED TRUSTED DEVICE VERIFICATION AND REMOTE ACCESS PROCESSING SYSTEM

(71) Applicant: SGA Solutions Co., Ltd., Seoul (KR)

(72) Inventors: Ki Uk Lee, Seongnam-si (KR); Jong Hwa Lee, Seoul (KR); Jae Hyeok Park, Seoul (KR)

(73) Assignee: SGA Solutions Co., Ltd., South (KR)

( * ) Notice: Subject to any disclaimer, the term of this patent is extended or adjusted under 35 U.S.C. 154(b) by 516 days.

(21) Appl. No.: 18/337,151

(22) Filed: Jun. 19, 2023

(65) Prior Publication Data

US 2024/0169071 A1 May 23, 2024

(30) Foreign Application Priority Data

Nov. 18, 2022 (KR) ........................ 10-2022-0155009

(51) Int. Cl.
*G06F 21/57* (2013.01)
*G06F 21/54* (2013.01)
*G06F 21/55* (2013.01)

(52) U.S. Cl.
CPC ............ *G06F 21/577* (2013.01); *G06F 21/54* (2013.01); *G06F 21/552* (2013.01)

(58) Field of Classification Search
CPC ....... G06F 21/577; G06F 21/54; G06F 21/552
See application file for complete search history.

(56) References Cited

U.S. PATENT DOCUMENTS 11,563,764 B1 * 1/2023 Hoscheit ................. H04L 63/20
2006/0212925 A1 * 9/2006 Shull ................... H04L 63/1408 726/1
2009/0094164 A1 * 4/2009 Fontaine ............... H04L 63/107 705/67

(Continued)

FOREIGN PATENT DOCUMENTS

KR 10-2009-0121466 11/2009
KR 10-2018-0018197 2/2018
KR 10-2019-0135621 12/2019

OTHER PUBLICATIONS

Office Action for Korean Patent Application No. 10-2022-0155009, dated Feb. 8, 2023.

*Primary Examiner* — Catherine Thiaw
*Assistant Examiner* — Daniel Elahian

(57) ABSTRACT

A device risk-based trusted device verification and remote access processing includes: an inspection process start unit for starting a risk inspection process based on risk inspection information set in a device management server; a risk score calculation unit for performing a vulnerability check process and an additional check process corresponding to inspection items based on the risk inspection information to calculate a risk score for the user device through the check result; a trusted device confirmation unit, when a function of the risk score calculation unit is completely performed and the risk score is completely calculated, for transmitting the calculated risk score to the device management server, thereby allowing the device management server to determine whether the user device is a trusted device; and an access monitoring unit for monitoring data transmission and reception in real time between the user device and the business server upon remote access.

3 Claims, 7 Drawing Sheets

(56) References Cited

U.S. PATENT DOCUMENTS

| | | | | |
|---|---|---|---|---|
| 2010/0146611 | A1* | 6/2010 | Kuzin | H04L 63/0815 726/8 |
| 2018/0063178 | A1* | 3/2018 | Jadhav | H04L 63/1433 |
| 2018/0124096 | A1* | 5/2018 | Schwartz | H04W 8/22 |
| 2019/0319987 | A1* | 10/2019 | Levy | H04L 63/08 |
| 2022/0029882 | A1* | 1/2022 | Sarukkai | H04L 41/0886 |
| 2022/0255942 | A1* | 8/2022 | Szigeti | H04L 63/102 |
| 2022/0407893 | A1* | 12/2022 | Maiman | H04W 12/71 |
| 2023/0237407 | A1* | 7/2023 | Chrapko | G06Q 10/0635 706/12 |
| 2023/0418949 | A1* | 12/2023 | Stocks | G06F 40/20 |

* cited by examiner

【FIG. 1】
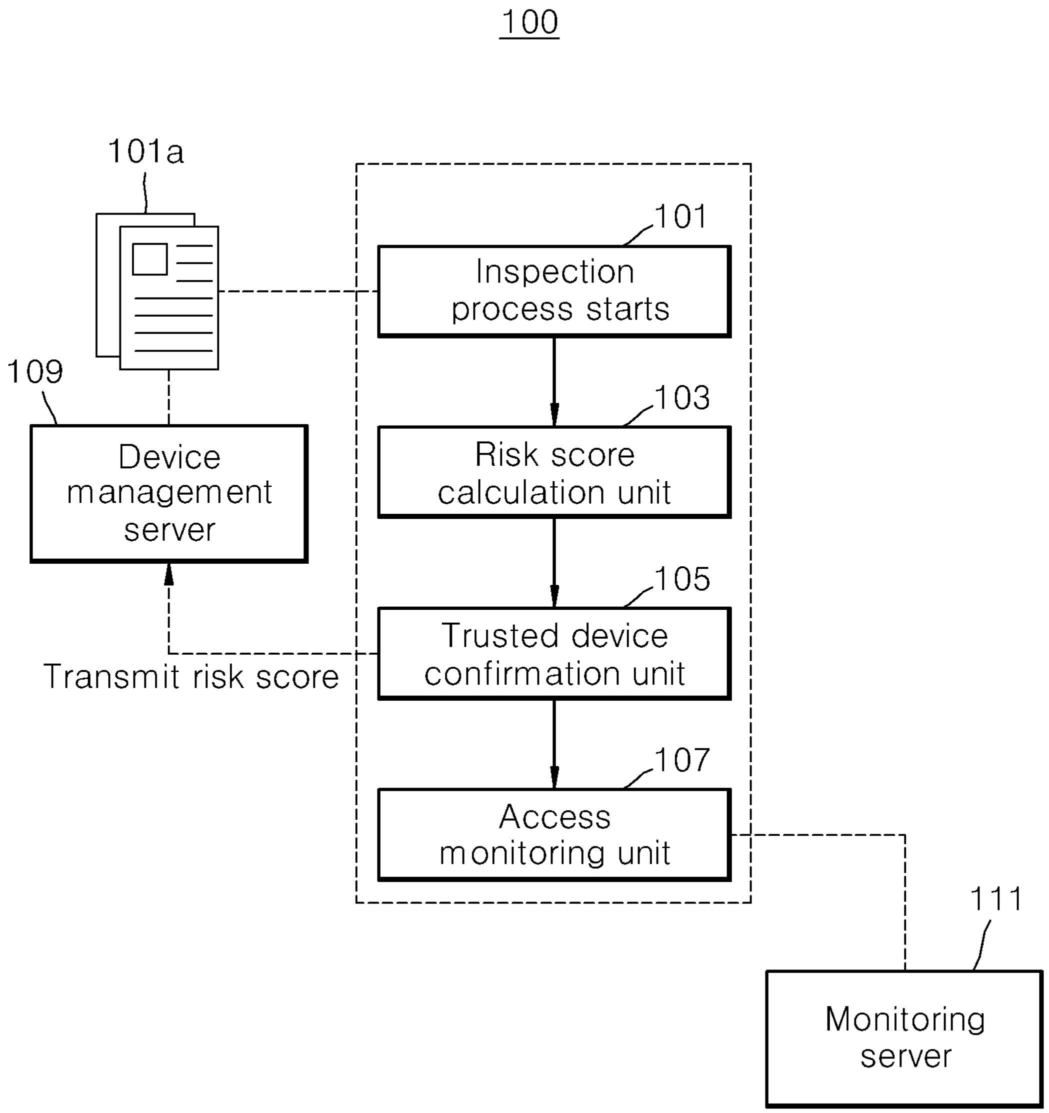

【FIG. 2】

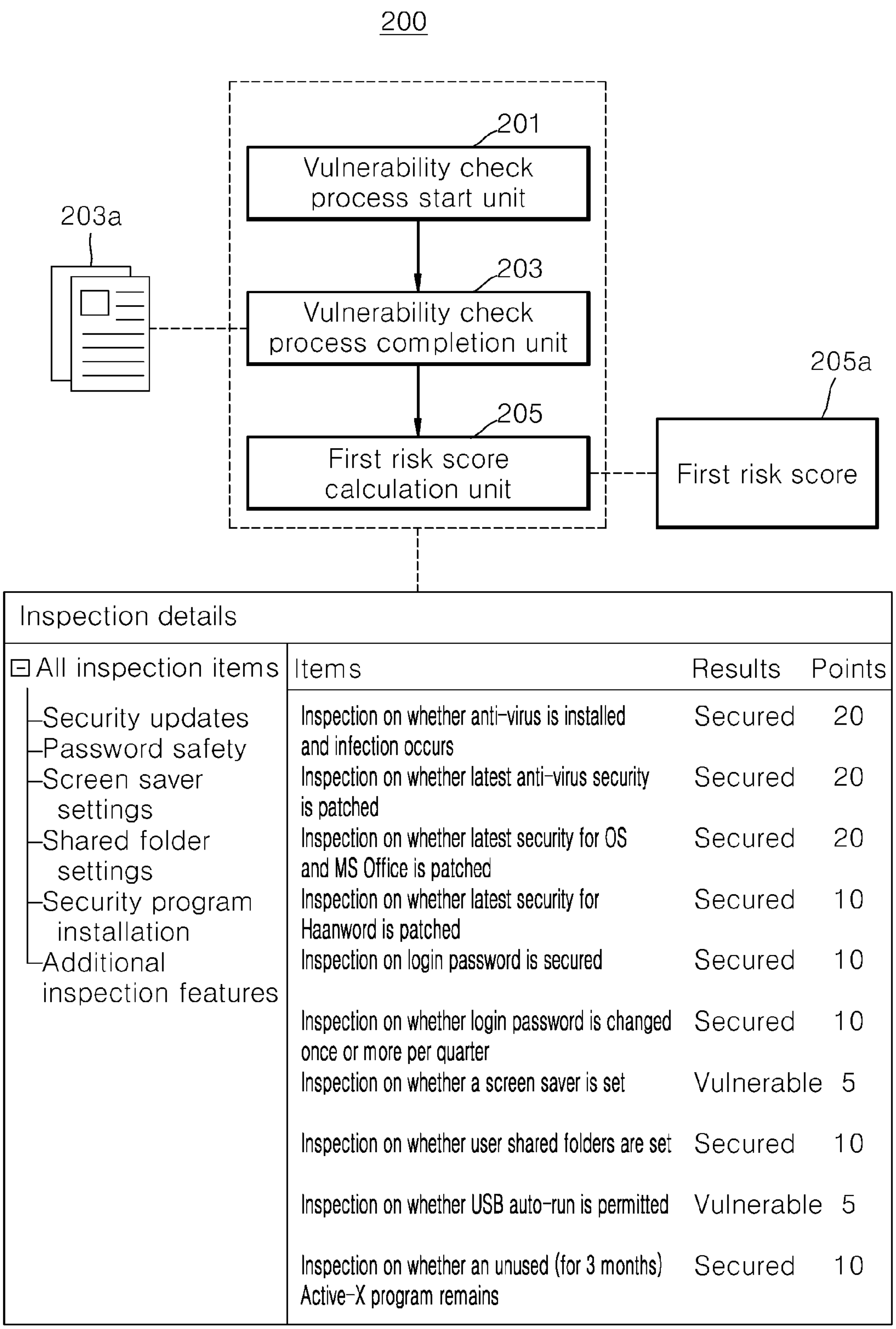

201 Vulnerability check process start unit

203 Vulnerability check process completion unit

203a

205 First risk score calculation unit

205a First risk score

Inspection details

| All inspection items | Items | Results | Points |
|---|---|---|---|
| Security updates | Inspection on whether anti-virus is installed and infection occurs | Secured | 20 |
| Password safety | Inspection on whether latest anti-virus security is patched | Secured | 20 |
| Screen saver settings | Inspection on whether latest security for OS and MS Office is patched | Secured | 20 |
| Shared folder settings | Inspection on whether latest security for Haanword is patched | Secured | 10 |
| Security program installation | Inspection on login password is secured | Secured | 10 |
| Additional inspection features | Inspection on whether login password is changed once or more per quarter | Secured | 10 |
| | Inspection on whether a screen saver is set | Vulnerable | 5 |
| | Inspection on whether user shared folders are set | Secured | 10 |
| | Inspection on whether USB auto-run is permitted | Vulnerable | 5 |
| | Inspection on whether an unused (for 3 months) Active-X program remains | Secured | 10 |

【FIG. 3】

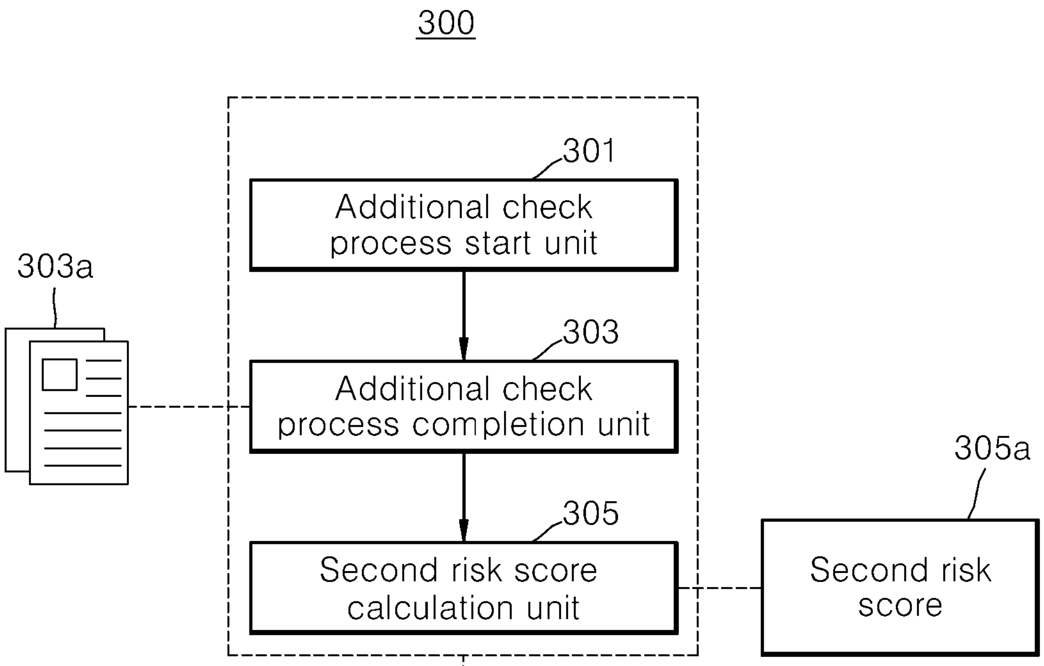

Inspection details

| ⊟ All inspection items | Items | Results | Points |
|---|---|---|---|
| Security updates | Inspection on whether editing program is installed | Secured | 20 |
| Password safety | Inspection on whether wireless LAN card is installed | Secured | 20 |
| Screen saver settings | Inspection on whether secure USB is installed | Secured | 20 |
| Shared folder settings | Inspection on whether unauthorized program is installed | Secured | 10 |
| Security program installation | Inspection on web browser settings | Secured | 10 |
| Additional inspection features | Inspection on firewall settings | Secured | 10 |
| | Inspection on user device account settings | Vulnerable | 5 |
| | Inspection on port vulnerability | Secured | 10 |
| | Inspection on whether security sensor is activated | Vulnerable | 5 |
| | Inspection on whether NTP server is synchronized | Secured | 10 |

【FIG. 4】
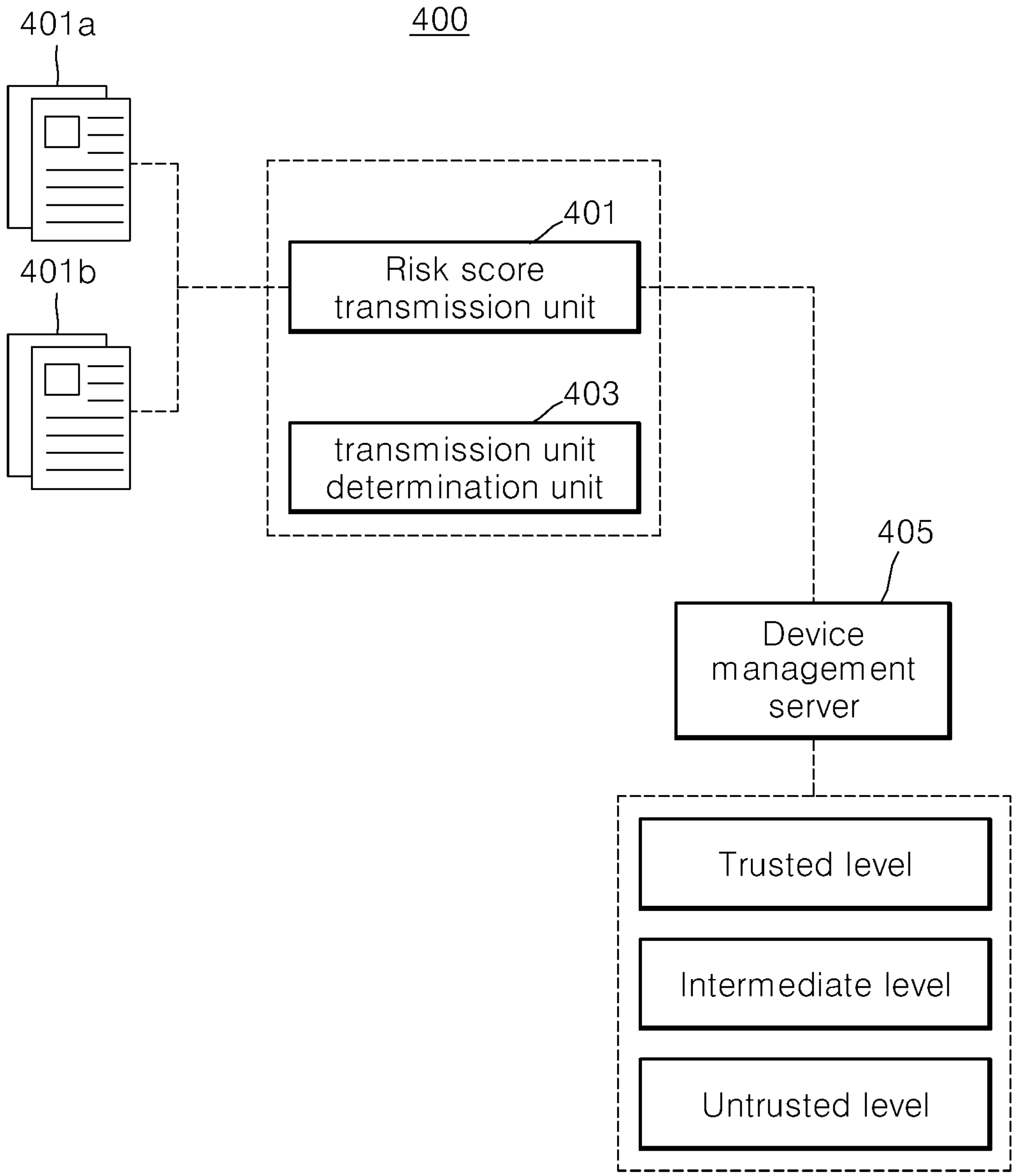

【FIG. 5】
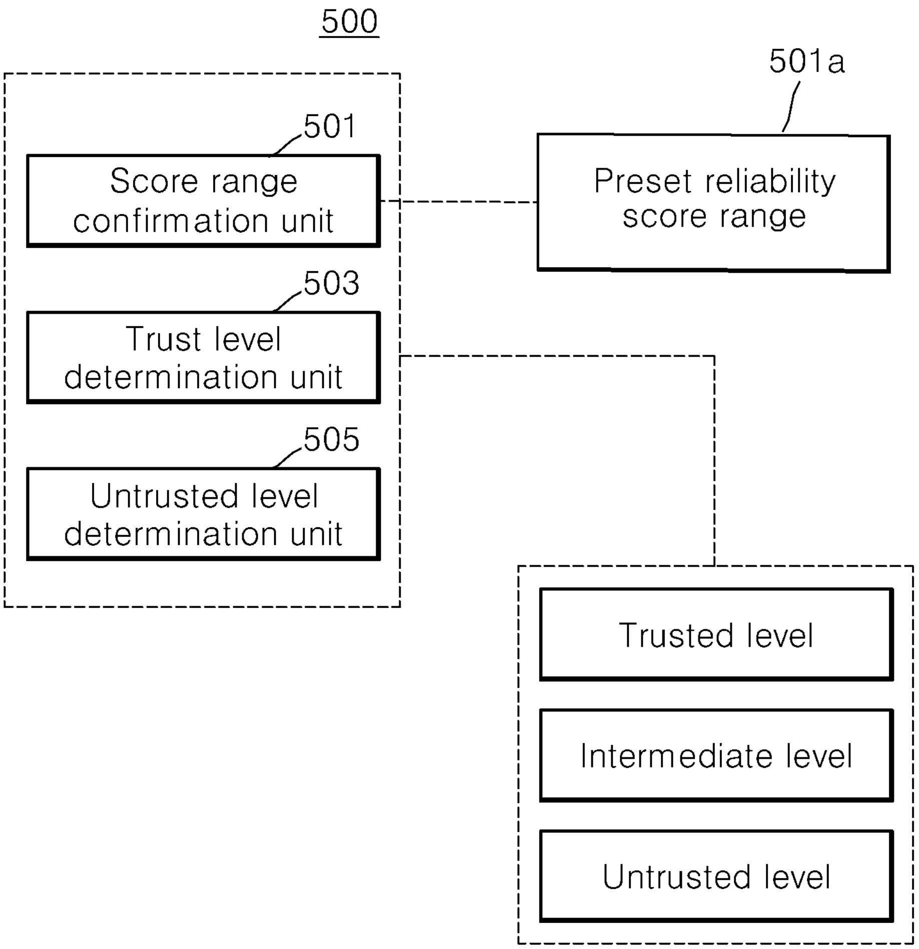

【FIG. 6】
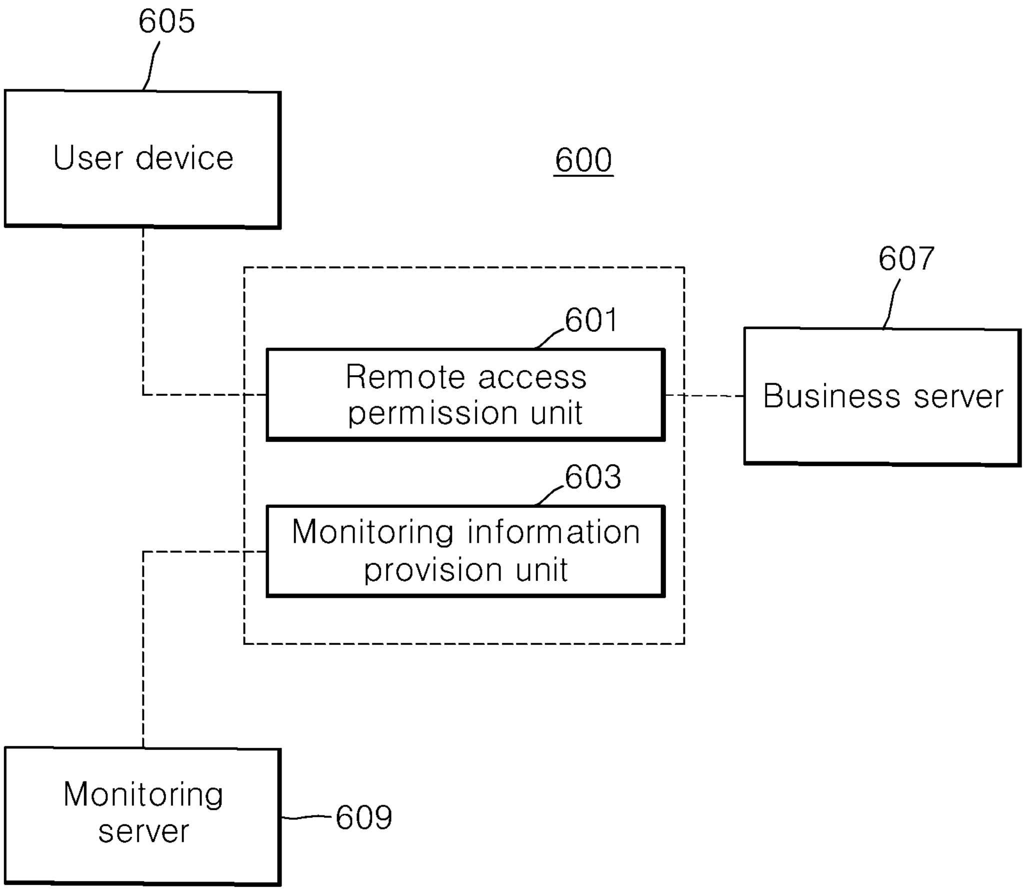

【FIG. 7】
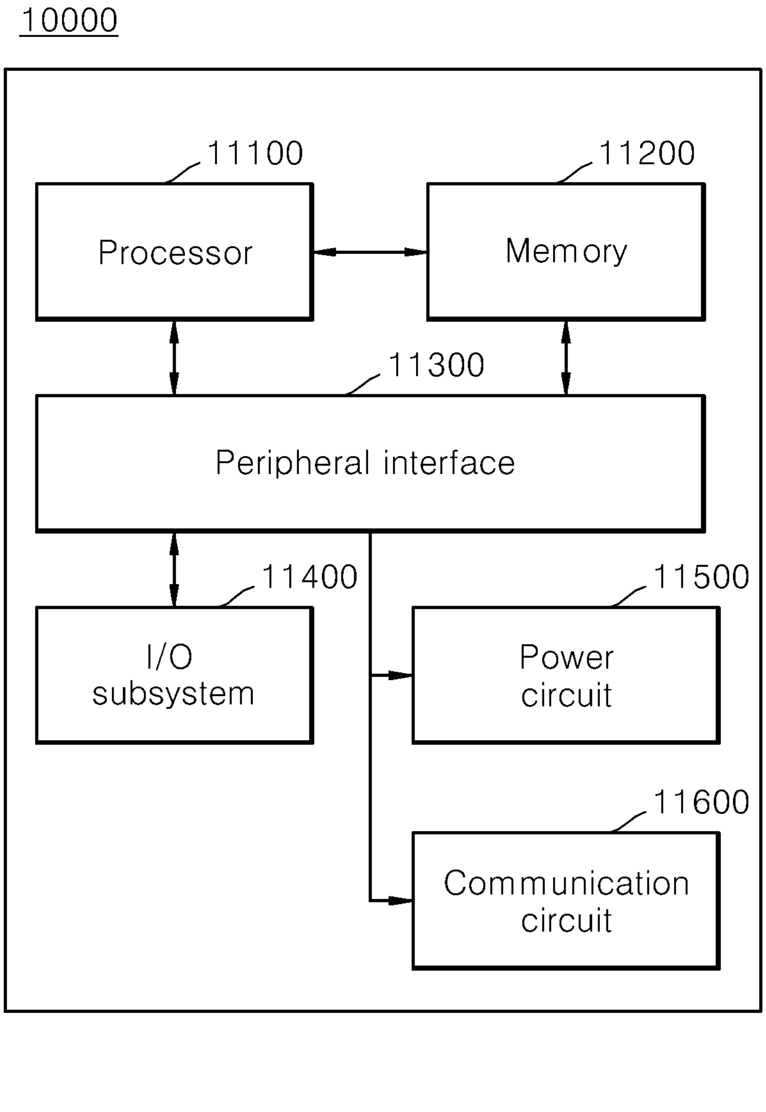

DEVICE RISK-BASED TRUSTED DEVICE VERIFICATION AND REMOTE ACCESS PROCESSING SYSTEM

BACKGROUND OF THE INVENTION

1. Field of the Invention

The present invention relates to a device risk-based trusted device verification and remote access processing system, and more particularly, to a technology in which, when a remote access application installed on a user device is executed, a risk score for the user device is calculated by starting a risk check process based on risk inspection information set in a device management server linked with the remote access application, the calculated risk score is transmitted to the device management server so as to allow the device management server to determine whether the user device is a trusted device through the received risk score, the device management server registers the user device when the user device is determined to be a trusted device so that the user device is allowed to remotely access a business server linked with the remote access application, and data transmission and reception is monitored in real time between the user device and the business server when the user device remotely accesses the business server.

2. Description of the Related Art

As companies adopt telecommuting or flexible work systems to continue business while reducing the impact of the spread of Covid-19, collaboration solutions capable of implementing remote access, video conference and the like as a communication means suitable for the changed business system have been spotlighted. Among the solutions, most companies are implementing telecommuting through virtual desktop infrastructure (VDI). However, information leakage problems frequently occur because it is difficult to determine whether the account accessed through remote access corresponds to an employee of the company or a hacker who hacked the employee's account.

Accordingly, in the field, various technologies are being developed to prevent the problem of information leaked by external personnel other than personnel verified by the company by verifying an account and a device accessing a business server.

As an example, Korean Patent Registration No. 10-1579486 (SYSTEM FOR VERIFYING APPLICATION REMOTELY BASED ON CLOUD) discloses a technology for enabling a smart device user to verify an application from a remote site through a network.

However, the above-mentioned related art simply discloses only the technology for verifying an application which provides a remote function installed on a smart device, and does not disclose the technology that, when a remote access application installed on a user device is executed, a risk score for the user device is calculated by starting a risk check process based on risk inspection information set in a device management server linked with the remote access application, the calculated risk score is transmitted to the device management server so as to allow the device management server to determine whether the user device is a trusted device through the received risk score, the device management server registers the user device when the user device is determined to be a trusted device so that the user device is allowed to remotely access a business server linked with the remote access application, and data transmission and reception is monitored in real time between the user device and the business server when the user device remotely accesses the business server. Thus, the need for a technology for solve the above problem is emerging.

SUMMARY OF THE INVENTION

Accordingly, an object of the present invention is to provide a device risk-based trusted device verification and remote access processing system, such that, when a remote access application installed on a user device is executed, a risk score for the user device is calculated by starting a risk check process based on risk inspection information set in a device management server linked with the remote access application, the calculated risk score is transmitted to the device management server so as to allow the device management server to determine whether the user device is a trusted device through the received risk score, the device management server registers the user device when the user device is determined to be a trusted device so that the user device is allowed to remotely access a business server linked with the remote access application, and data transmission and reception is monitored in real time between the user device and the business server when the user device remotely accesses the business server, thereby performing verification on the user device accessed by the user to allow only the verified user device and account access the business server, so that information is prevented from being leakage by external personnel and hackers.

The device risk-based trusted device verification and remote access processing system implemented in a computing device including at least one processor and at least one memory for storing instructions executable by the processor according to one embodiment of the present invention includes: an inspection process start unit, when a remote access application installed on a user device is executed, for starting a risk inspection process based on risk inspection information set in a device management server linked with the remote access application; a risk score calculation unit for performing a vulnerability check process and an additional check process corresponding to inspection items based on the risk inspection information when the risk inspection process starts, so as to calculate a risk score for the user device through the check result; a trusted device confirmation unit, when a function of the risk score calculation unit is completely performed and the risk score is completely calculated, for transmitting the calculated risk score to the device management server, thereby allowing the device management server to determine whether the user device is a trusted device through the received risk score; and an access monitoring unit, when the user device is determined to be the trusted device by performing a function of the trusted device confirmation unit and while the device management server registers the user device so that the user device is allowed to remotely access a business server linked with the remote access application, for monitoring data transmission and reception in real time between the user device and the business server when the user device remotely accesses the business server.

The risk inspection information, refers to information generated by the device management server, and may preferably be information composed of vulnerability check items and additional check items including a plurality of pieces of inspection information for verifying whether the user device is a trusted device when the remote access application installed on the user device is executed.

The risk score calculation unit may include: a vulnerability check process start unit for starting a vulnerability check process for the user device when the risk inspection process starts; a vulnerability check process completion unit, when the vulnerability check process starts, for completing a vulnerability check process for the user device by performing at least one of inspection on anti-virus installation, inspection on whether anti-virus is executed, inspection on latest security patches of anti-virus, inspection on latest security patches of an operating system, inspection on latest security patches of a work program, inspection on password stability, inspection on quarterly password change, inspection on screen saver settings, inspection on shared folder settings and inspection on USB auto-run permission, which are based on some of the pieces of inspection information included in the vulnerability check item based on the risk inspection information; and a first risk score calculation unit for calculating scores for detailed inspections included in the vulnerability check item through a first check result based on the completed vulnerability check process when a function of the vulnerability check process completion unit is completely performed, thereby calculating a first risk score for a vulnerability of the user device by applying the calculated score to a preset risk score formula.

The risk score calculation unit may include: an additional test process start unit for starting an additional test process for the user device when the vulnerability check process is performed; an additional check process completion unit, when the additional check process starts, for performing at least one of inspection on whether an editing program is installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized, which are based on some of the pieces of inspection information included in the additional check item based on the risk inspection information, thereby completing an additional check process for the user device; and a second risk score calculation unit, when a function of the additional check process completion unit is completely performed, for calculating scores for detailed inspections included in the additional check item through a second check result based on the completed additional check process, thereby calculating a second risk score for a function setting of the user device by applying the calculated score to the preset risk score formula.

The trusted device confirmation unit may include: a risk score transmission unit, when a function of the risk score calculation unit is completely performed and the first risk score and the second risk score are completely calculated, for transmitting the first risk score and the second risk score to the device management server; and a trusted device determination unit, when the device management server receives the first risk score and the second risk score and then the device management server determines a reliability level for the user device through the first risk score and the second risk score, for determining whether the user device is a trusted device through the determined reliability level.

The device management server may include: a score range confirmation unit for confirming whether each of the first risk score and the second risk score is included in any one of preset reliability score ranges when the first risk score and the second risk score are received from the risk score transmission unit; a trusted level determination unit for determining a reliability level of the user device as a trusted level when the score range confirmation unit confirms that both of the first risk score and the second risk score are included in the first score range among the preset reliability score ranges; and an untrusted level determination unit, when the score range confirmation unit confirms that each of the first risk score and the second risk score is included in at least one of a second score range or a third score range among the preset reliability score ranges, for determining a reliability level of the user device as an intermediate level corresponding to the second score range or an untrusted level corresponding to the third score range.

When the reliability level of the user device is determined to be the intermediate level by performing a function of the untrusted level determination unit, the device management server may identify detailed inspections less than a designated score among detailed inspections based on the vulnerability check process and detailed inspections based on the additional check process through history information based on the vulnerability check inspection process and the additional check process, and provide the user device with setting guide information for calculating the identified detailed inspections to have the designated score or higher so as to allow a user of the user device to change settings of the user device through the setting guide information, so that the reliability level of the user device may be re-determined as a trusted level.

The access monitoring unit may include: a remote access permission unit for determining the user device as a trusted device when the reliability level of the user device is determined as the trusted level from the device management server by performing the function of the trusted device confirmation unit, thereby registering the user device to allow the user device to remotely access the business server; and a monitoring information provision unit for providing a monitoring server with monitoring information obtained by monitoring data transmitted and received between the business server and the user device when the user device remotely accesses the business server while a function of the remote access permission unit is completely performed.

The device risk-based trusted device verification and remote access processing system of the present invention allows a user device to remotely access a business server when the user device trying to access the business server is verified as a trusted device, so that information can be prevented from being leaked to the outside except for personnel and devices verified by the company.

In addition, monitoring information generated based on data transmitted and received between the business server and the user device can prevent business information stored in the business server from being abused.

BRIEF DESCRIPTION OF THE DRAWINGS

FIG. 1 is a block diagram for explaining a device risk-based trusted device verification and remote access processing system according to one embodiment of the present invention.

FIG. 2 is a block diagram for explaining a risk score calculation unit of the device risk-based trusted device verification and remote access processing system according to one embodiment of the present invention.

FIG. 3 is another block diagram for explaining the risk score calculation unit of the device risk-based trusted device verification and remote access processing system according to one embodiment of the present invention.

FIG. 4 is a block diagram for explaining a trusted device confirmation unit of the device risk-based trusted device verification and remote access processing system according to one embodiment of the present invention.

FIG. 5 is a block diagram for explaining a device management server of the device risk-based trusted device verification and remote access processing system according to one embodiment of the present invention.

FIG. 6 is a block diagram for explaining an access monitoring unit of the device risk-based trusted device verification and remote access processing system according to one embodiment of the present invention.

FIG. 7 is a diagram for explaining an example of an internal configuration of a computing device according to one embodiment of the present invention.

DETAILED DESCRIPTION OF THE INVENTION

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect(s) may be carried out without the specific details. The following description and accompanying drawings will be set forth in detail for specific illustrative aspects among one or more aspects. However, the aspects are merely illustrative and some of various ways among principles of the various aspects may be employed, and the descriptions set forth herein are intended to include all the various aspects and equivalents thereof.

The terms "embodiment", "example", "aspect" or the like used in the present specification may not be construed in that an aspect or design set forth herein is preferable or advantageous than other aspects or designs.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, all terms used herein including technical or scientific terms have the same meaning as commonly understood by those having ordinary skill in the art unless defined otherwise. Terms such as those defined in generally used dictionaries will be interpreted to have the meaning consistent with the meaning in the context of the related art, will not be interpreted as an ideal or excessively formal meaning unless expressly defined in an embodiment of the present invention.

FIG. 1 is a block diagram for explaining a device risk-based trusted device verification and remote access processing system according to one embodiment of the present invention.

Referring to FIG. 1, a device risk-based trusted device verification and remote access processing system 100 (hereinafter, referred to as a verification access system) may include an inspection process start unit 101, a risk score calculation unit 103, a trusted device confirmation unit 105, and an access monitoring unit 107.

According to one embodiment, when a remote access application installed on a user device is executed, the inspection process start unit 101 may start a risk inspection process based on risk inspection information 101*a* set in a device management server 109 linked with the remote access application.

According to one embodiment, the user device refers to an electronic device in which a user account for accessing a business server is logged in, and may include, for example, a smart phone, a desktop, a tablet and the like. Accordingly, when the user device is a desktop, a remote access program may be installed on the desktop.

According to one embodiment, the device management server 109 refers to a configuration for managing a remote access application and a remote access program installed on the user device, and may be configured to manage and control remote access between the user device and the business server.

According to one embodiment, the risk inspection information 101*a* refers to information generated by the device management server 109, and may be information composed of vulnerability check items and additional check items including a plurality of pieces of inspection information for verifying whether the user device is a trusted device when the remote access application (or remote access program) installed on the user device is executed.

In this regard, the pieces of inspection information included in the vulnerability check items and additional check items constituting the risk inspection information 101*a* refers to information set by an administrator account of the device management server 109, and the pieces of inspection information may be inspection information for verifying (reference information necessary for inspecting) whether the user device is the trusted device.

According to one embodiment, the inspection items corresponding to the pieces of inspection information included in the vulnerability check items and the additional check items may be changed, added or deleted by the administrator account.

According to one embodiment, the risk inspection refers to a process performed to confirm whether the user device is a trusted device, and may include a risk inspection process and an additional check process. The risk inspection process may be executed at every designated time.

For example, the risk inspection process may be executed at every day or executed at every period predetermined by the administrator account, and may be executed when the risk score of the user device exceeds a preset execution a reference value on a daily, weekly or monthly basis. Accordingly, when the risk of the user device does not exceed the preset execution reference value on the daily, weekly or monthly basis, the risk inspection process may not be executed. In this regard, the preset execution reference value may be set by the administrator account.

According to one embodiment, a detailed description related to the risk inspection process will be described in FIG. 2, and a detailed description related to the additional check process will be described in FIG. 3.

According to one embodiment, when the risk inspection process starts, the risk score calculation unit 103 may perform a vulnerability check process and an additional check process corresponding to inspection items (the vulnerability check items and the additional check items) based on the risk inspection information 101*a*, thereby calculating a risk score for the user device through the check result.

In this regard, the vulnerability check process refers to a process including inspection on whether anti-virus is installed, inspection on whether anti-virus is executed, inspection on whether latest anti-virus security is patched, inspection on whether latest operating system security is patched, inspection on whether latest business program security is patched, inspection on whether password is stable, inspection on whether password is quarterly changed, inspection on screen saver settings, inspection on shared folder settings and inspection on USB auto-run permission, and may be a process for preventing malware on the user device and searching for vulnerabilities on programs necessary for business.

In this regard, the additional check process refers to a process including inspection on whether an editing program is installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized, and may be a process related to security and settings for allowing the user device to access the business server.

According to one embodiment, the risk score refers to a configuration calculated by the risk inspection process, and may be configured to be utilized to determine whether the user device is a trusted device. According to the present invention, the user device may be determined as a risky device other than a trusted device when the user device has a lower risk score, and the user device may be determined as a trusted device when the user device has a higher risk score.

According to one embodiment, when a function of the risk score calculation unit 103 is completely performed and the risk score is completely calculated, the trusted device confirmation unit 105 may transmit the calculated risk score to the device management server 109, so that the device management server 109 may determine whether the user device is a trusted device through the received risk score.

In this regard, the device management server 109 may determine whether the user device is a trusted device or a risky device, based on the risk score received from the trusted device confirmation unit 105. Accordingly, the device management server 109 may determine whether the user device is the trusted device or the risky device through the risk score, and transmit result information based on the determination result to the access monitoring unit 107.

When the user device is a trusted device, the device management server 109 may register the user account and the user device (Mac address of the user device) in an access permission list so as to allow the user device with the log-in user account to access the business server.

According to one embodiment, when the user device is determined as the trusted device by performing the function of the trusted device confirmation unit 105 and accordingly the device management server 109 registers the user device so that the user device is allowed to remotely access a business server linked with the remote access application, the access monitoring unit 107 may monitor data transmission and reception between the user device and the business server in real time when the user device remotely accesses the business server.

According to one embodiment, the business server refers to a configuration for providing a component and an interface for allowing a user account logged in to the user device to handle business, and may be a database that stores business information related to business of the company.

According to one embodiment, when receiving the result information from the device management server 109 and confirming that the user device is a trusted device, the access monitoring unit 107 may confirm that the user device is registered in the access permission list by the device management server 109.

Then, when the user device accesses the business server, the access monitoring unit 107 may transmit monitoring information based on a result of monitoring data transmission and reception between the user device and the business server in real time to a monitoring server 111. The monitoring server 111 refers to a configuration for storing the monitoring information, and may be configured to monitor and manage whether the user device leaks the business information to the outside or performs an illegal action through the monitoring information.

FIG. 2 is a block diagram for explaining a risk score calculation unit of the device risk-based trusted device verification and remote access processing system according to one embodiment of the present invention.

Referring to FIG. 2, the device risk-based trusted device verification and remote access processing system (e.g., the device risk-based trusted device verification and remote access processing system 100 of FIG. 1) (hereinafter, referred to as a verification access system) may include a risk score calculation unit 200 (e.g., the risk score calculation unit 103 of FIG. 1).

According to one embodiment, when the risk inspection process starts, the risk score calculation unit 200 may perform a vulnerability check process and an additional check process corresponding to inspection items based on the risk inspection information, thereby calculating a risk score for the user device through the check result.

According to one embodiment, the risk score calculation unit 200 refers to a detailed configuration for performing the above-described functions, and may include a vulnerability check process start unit 201, a vulnerability check process completion unit 203, and a first risk score calculation unit 205.

According to one embodiment, when the risk inspection process starts, the vulnerability check process start unit 201 may start a vulnerability check process for the user device. In this regard, the vulnerability check process may be a process for preventing malware on the user device and searching for vulnerabilities on programs necessary for business.

According to one embodiment, when the vulnerability check process starts, the vulnerability check process completion unit 203 may complete the vulnerability check process for the user device by performing at least one of inspection on anti-virus installation, inspection on whether anti-virus is executed, inspection on latest security patches of anti-virus, inspection on latest security patches of an operating system, inspection on latest security patches of a work program, inspection on password stability, inspection on quarterly password change, inspection on screen saver settings, inspection on shared folder settings and inspection on USB auto-run permission, which are based on some of a plurality of pieces of inspection information included in a vulnerability check item based on risk inspection information 203*a*.

According to one embodiment, the pieces of inspection information refer to information selected by an administrator account in the device management server, and may be inspection information for verifying (reference information necessary for inspecting) whether the user device is the trusted device. In other words, some of the pieces of inspection information used in the vulnerability check process may be reference information utilized to verify whether the user device is a trusted device in at least one among the above-mentioned inspection on anti-virus installation, inspection on whether anti-virus is executed, inspection on latest security patches of anti-virus, inspection on latest security patches of an operating system, inspection on latest security patches of a work program, inspection on password stability, inspection on quarterly password change, inspection on screen saver settings, inspection on shared folder settings and inspection on USB auto-run permission.

For example, first inspection information among the pieces of inspection information may be reference information for determining whether anti-virus is installed in the user device. It may be information used to confirm whether an anti-virus application (anti-virus program) based on the first inspection information is installed in the user device when the vulnerability check process completion unit 203 performs the vulnerability check process.

According to one embodiment, when a function of the vulnerability check process completion unit 203 is completely performed, the first risk score calculation unit 205 may calculate scores for detailed inspections included in the vulnerability check item through a first check result based on the completed vulnerability check process, thereby calculating a first risk score 205*a* for a vulnerability of the user device by applying the calculated score to a preset risk score formula.

In this regard, the first risk score calculation unit 205 may calculate a score for each of the detailed inspections through a check result (first check result) for each of the detailed inspections based on the vulnerability check process. The first risk score calculation unit may calculate the score for each detailed inspection based on the vulnerability check process, based on a vulnerability check score table. The vulnerability check score table refers to a data table including score information for each detailed inspection based on the vulnerability check process, and may include, for example, score information in which different scores are matched by a plurality of results about the inspection, as a first detailed inspection, on whether the anti-virus is executed. The score may include a first score corresponding to being secured (e.g., 20 points), a second score corresponding to being vulnerable (e.g., 10 points), and a third score corresponding to being very vulnerable (e.g., 5 points).

In other words, the vulnerability check score table may be a data table including score information in which different scores are matched for a plurality of results on each of the above-mentioned inspection on anti-virus installation, inspection on whether anti-virus is executed, inspection on latest security patches of anti-virus, inspection on latest security patches of an operating system, inspection on latest security patches of a work program, inspection on password stability, inspection on quarterly password change, inspection on screen saver settings, inspection on shared folder settings and inspection on USB auto-run permission.

According to one embodiment, when the score for each detailed inspection based on the vulnerability check process is completely calculated through the vulnerability check score table, the first risk score calculation unit 205 may calculate the first risk score 205*a* by applying the calculated score to a preset risk score formula. The first risk score 205*a* refers to a configuration calculated based on the vulnerability check process to determine whether the user device is a trusted device, and may be configured to correspond to the risk for the vulnerability of the user device.

In this regard, the preset risk score formula refers to a configuration for calculating a risk score based on each of the vulnerability check process and the additional check process, and may be composed of the following formula: {(sum of points (20 points) of the inspection result as being secured)/(sum of all assigned points)}×100. However, the formula may be changed by the administrator account.

FIG. 3 is another block diagram for explaining the risk score calculation unit of the device risk-based trusted device verification and remote access processing system according to one embodiment of the present invention.

Referring to FIG. 3, the device risk-based trusted device verification and remote access processing system (e.g., the device risk-based trusted device verification and remote access processing system 100 of FIG. 1) (hereinafter, referred to as a verification access system) may include a risk score calculation unit 300 (e.g., the risk score calculation unit 103 of FIG. 1).

According to one embodiment, when the risk inspection process starts, the risk score calculation unit 300 may perform a vulnerability check process and an additional check process corresponding to inspection items based on the risk inspection information, thereby calculating a risk score for the user device through the check result.

According to one embodiment, the risk score calculation unit 300 refers to a detailed configuration for performing the above-described functions, and may include an additional check process start unit 301, an additional check process completion unit 303, and a second risk score calculation unit 305.

According to one embodiment, when the vulnerability check process is performed, the additional check process start unit 301 may start an additional check process for the user device. In this regard, the additional check process may be a process related to security and settings for allowing the user device to access the business server.

According to one embodiment, when the additional check process starts, the additional check process completion unit 303 may complete the additional check process for the user device by performing at least one of inspection on whether an editing program is installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized, which are based on some of a plurality of pieces of inspection information included in an additional check item based on risk inspection information 303*a*.

According to one embodiment, the pieces of inspection information refer to information selected by an administrator account in the device management server, and may be inspection information for confirming (reference information necessary for inspecting) whether security and functions are set in order to verify whether the user device is the trusted device. In other words, some of the pieces of inspection information used in the additional check process may be reference information used for confirming whether security and functions are set to verify whether the user device is a trusted device in the above-mentioned inspection on whether editing programs (such as Haansoft word, Word, PDF, and Power Point) are installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized.

For example, second inspection information among the pieces of inspection information refers to reference information for confirming whether a firewall of the user device is set, and may be reference information for confirming a setting value on whether the user device is allowed to access the business server. It may be information used to confirm whether the setting value of the firewall is set to the setting value based on the second inspection information when the additional check process completion unit 303 performs the additional check process.

According to one embodiment, when a function of the additional check process completion unit 303 is completely performed, the second risk score calculation unit 305 may calculate scores for detailed inspections included in the additional check item through a second check result based on the completed additional check process, thereby calculating a setting risk score 305*a* for security and function settings of the user device by applying the calculated score to a preset risk score formula.

In this regard, the second risk score calculation unit 305 may calculate a score for each of the detailed inspections through a check result (second check result) for each of the detailed inspections based on the additional check process. The second risk score calculation unit 305 may calculate the score for each detailed inspection based on the additional check process, based on the additional check score table. The additional check score table refers to a data table including score information for each detailed inspection based on the additional check process, and may include, for example, score information in which different scores are matched by a plurality of results about the inspection, as a second detailed inspection, on whether the firewall is set. The score may include a first score corresponding to being secured (e.g., 20 points), a second score corresponding to being vulnerable (e.g., 10 points), a third score corresponding to being very vulnerable (e.g., 5 points).

In other words, the additional check score table may be a data table including score information in which different scores are matched for a plurality of results on each of the above-mentioned inspection on whether editing programs (such as Haansoft word, Word, PDF, and Power Point) are installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized.

According to one embodiment, when the score for each detailed inspection based on the additional check process is completely calculated through the additional check score table, the second risk score calculation unit 305 may calculate the second risk score 305*a* by applying the calculated score to a preset risk score formula. The second risk score 305*a* refers to a configuration calculated based on the additional check process to determine whether the user device is a trusted device, and may be configured to correspond to the risk for the security and functions of the user device.

In this regard, the preset risk score formula refers to a configuration for calculating a risk score based on each of the vulnerability check process and the additional check process, and may be composed of the following formula: {(sum of points (20 points) of the inspection result as being secured)/(sum of all assigned points)}×100. However, the formula may be changed by the administrator account. When the risk score configured by the above formula ends with a decimal point, a risk score in integer units may be calculated by rounding off to one decimal place.

FIG. 4 is a block diagram for explaining a trusted device confirmation unit of the device risk-based trusted device verification and remote access processing system according to one embodiment of the present invention.

Referring to FIG. 4, the device risk-based trusted device verification and remote access processing system (for example, the device risk-based trusted device verification and remote access processing system 100 of FIG. 1) (hereinafter, referred to as a verification access system) may include a trusted device confirmation unit 400 (e.g., the trusted device confirmation unit 105 in FIG. 1).

According to one embodiment, when the function of the risk score calculation unit 200 (e.g., the risk score calculation unit 103 of FIG. 1) is completely performed and the risk score (first risk score and second risk score) is completely calculated, the trusted device confirmation unit 400 may transmit the calculated risk score to the device management server 405, so as to allow the device management server 405 to determine whether the user device is a trusted device through the received risk score.

According to one embodiment, the trusted device confirmation unit 400 refers to a detailed configuration for performing the above-described functions, and may include a risk score transmission unit 401 and a trusted device determination unit 403.

According to one embodiment, when the function of the risk score calculation unit is completely performed and the first risk score 401*a* and the second risk score 401*b* are completely calculated, the risk score transmission unit 401 may transmit the first risk score 401*a* and the second risk score 401*b* to the device management server 405.

According to one embodiment, when the device management server 405 receives the first risk score 401*a* and the second risk score 401*b* and then when the device management server 405 determines a reliability level of the user device through the first risk score 401*a* and the second risk score 401*b*, the trusted device determination unit 403 may determine whether the user device is a trusted device through the determined reliability level.

In this regard, the description on that the device management server 405 determines the reliability level for the user device through the first risk score 401*a* and the second risk score 401*b* will be followed in detail in FIG. 5.

According to one embodiment, when receiving information on determining whether the user device is a trusted device from the device management server 405, the trusted device determination unit 403 may determine whether the user device is a trusted device through the received information.

FIG. 5 is a block diagram for explaining a device management server of the device risk-based trusted device verification and remote access processing system according to one embodiment of the present invention.

Referring to FIG. 5, the device risk-based trusted device verification and remote access processing system (for example, the device risk-based trusted device verification and remote access processing system 100 of FIG. 1) (hereinafter, referred to as a verification access system) may include a device management server 500 (e.g., the device management server 111 of FIG. 1).

According to one embodiment, the device management server 500 may include a score range confirmation unit 501, a trusted level determination unit 503 and an untrusted level determination unit 505.

According to one embodiment, when receiving the first risk score and the second risk score from the risk score transmission unit (e.g., the risk score transmission unit 401 of FIG. 4), the score range confirmation unit 501 may confirm whether each of the first risk score and the second risk score is included in any one of preset reliability score ranges.

In this regard, the preset reliability score range is configured to include a plurality of score ranges, and may include a first score range, a second score range and a third score range. The first score range may be a trusted level score range, the second score range may be an intermediate level score range, and the third score range may be an untrusted level score range.

According to one embodiment, when the score range confirmation unit 501 confirms that both of the first risk score and the second risk score are included in the first score range among preset reliability score ranges, the trust level determination unit 503 may determine a reliability level of the user device as a trusted level.

In this regard, when the first risk score is included in the first score range and the second risk score is not included in the first score range, the trust level determination unit 503 may not determine the reliability level of the user device as a trusted level.

According to one embodiment, when the score range confirmation unit 501 confirms that each of the first risk score and the second risk score is included in at least one of a second score range or a third score range among the preset reliability score ranges, the untrusted level determination unit 505 may determine a reliability level of the user device as an intermediate level corresponding to the second score range or an untrusted level corresponding to the third score range.

According to one embodiment, when the reliability level of the user device is determined to be the intermediate level by performing a function of the untrusted level determination unit 505, the device management server 500 may identify detailed inspections less than a designated score among detailed inspections based on the vulnerability check process and detailed inspections based on the additional check process through history information based on the vulnerability check inspection process and the additional check process, and provide the user device with setting guide information for calculating the identified detailed inspections to have the designated score or higher so as to allow a user of the user device to change settings of the user device through the setting guide information, so that the reliability level of the user device may be re-determined as a trusted level.

According to one embodiment, the setting guide information refers to guide information for calculating a detailed inspection less than a designated score to have the specified score or higher, and may be guide information for setting the setting of the user device corresponding to the detailed inspection less than the designated score to have the specification required by the device management server 500.

FIG. 6 is a block diagram for explaining an access monitoring unit of the device risk-based trusted device verification and remote access processing system according to one embodiment of the present invention.

Referring to FIG. 6, the device risk-based trusted device verification and remote access processing system (for example, the device risk-based trusted device verification and remote access processing system 100 of FIG. 1) (hereinafter, referred to as a verification access system) may include an access monitoring unit 600 (e.g., the access monitoring unit 107 in FIG. 1).

According to one embodiment, when a user device 605 is determined as a trusted device by performing the function of the trusted device confirm unit (e.g., the trusted device confirmation unit 105 of FIG. 1) and accordingly when the user device 605 remotely accesses the business server 607 while the device management server registers the user device 605 so that the user device is allowed to remotely access the business server 607 linked with the remote access application, the access monitoring unit 600 may monitor data transmission and reception between the user device 605 and the business server 607 in real time.

According to one embodiment, the access monitoring unit 600 refers to a detailed configuration for performing the above-described functions, and may include a remote access permission unit 601 and a monitoring information provision unit 603.

According to one embodiment, when the reliability level of the user device 605 is determined as the trusted level from the device management server by performing the function of the trusted device confirmation unit (e.g., the trusted device confirmation unit 400 of FIG. 1), the remote access permission unit 601 may determine the user device as a trusted device, so that the user device 605 may be registered to be enabled to remotely access the business server 607.

More particularly, when the reliability level of the user device 605 is determined as the trusted level from the device management server by performing the function of the trusted device confirmation unit, the remote access permission unit 601 may request the device management server to register the user account and the user device 605 in an access permission list so as to allow the user device with the log-in user account to remotely access the business server 607.

According to one embodiment, when the user device 605 remotely accesses the business server 607 while a function of the remote access permission unit 601 is completely performed, the monitoring information provision unit 603 may provide a monitoring server 609 with monitoring information obtained by monitoring data transmitted and received between the business server 607 and the user device 605.

According to one embodiment, the monitoring server 609 may be a server that monitors whether the user device 605 abuses data stored in the business server 607 or conducts illegal counterfeiting activities, based on the monitoring information.

In this regard, the data transmitted and received between the business server 607 and the user device 605 may include business information stored in the business server 607 and activity history information based on user activities. Accordingly, the monitoring server 609 may monitor the user device 605 for the business server 607 through the business information and the activity history information based on the monitoring information.

FIG. 7 is a diagram for explaining an example of an internal configuration of a computing device according to one embodiment of the present invention.

FIG. 7 shows one example of an internal configuration of a computing device according to one embodiment of the present invention. In the following description, unnecessary descriptions for embodiments redundant with those of FIGS. 1 to 6 will be omitted.

As shown in FIG. 7, the computing device 10000 may include at least one processor 11100, a memory 11200, a peripheral device interface 11300, an input/output subsystem (I/O subsystem) 11400, a power circuit 11500, and a communication circuit 11600. The computing device 10000 may correspond to a user terminal A connected to a tactile interface device or correspond to the above-mentioned computing device B.

The memory 11200 may include, for example, a high-speed random access memory, a magnetic disk, an SRAM, a DRAM, a ROM, a flash memory, or a non-volatile memory. The memory 11200 may include software modules, instruction sets, or various other data required for operations of the computing device 10000.

The access to the memory 11200 from other components of the processor 11100 or the peripheral interface 11300, may be controlled by the processor 11100.

The peripheral interface 11300 may combine an input and/or output peripheral device of the computing device 10000 to the processor 11100 and the memory 11200. The processor 11100 may execute the software module or the instruction set stored in memory 11200, thereby performing various functions for the computing device 10000 and processing data.

The I/O subsystem 11400 may combine various input/output peripheral devices to the peripheral interface 11300. For example, the I/O subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or arbitrary other components for generating, managing, or distributing power.

The communication circuit 11600 uses at least one external port, thereby enabling communication with other computing devices.

Alternatively, as described above, the communication circuit 11600 may, if necessary, transmit and receive an RF signal, also known as an electromagnetic signal, including RF circuitry, thereby enabling communication with other computing devices.

The above embodiment of FIG. 7 is merely an example of the computing device 10000, and the computing device 11000 may have a configuration or arrangement in which some of the components shown in FIG. 7 are omitted, additional components not shown in FIG. 7 are further included, or two or more components are combined. For example, a computing device for a communication terminal in a mobile environment may further include a touch screen, a sensor, and the like in addition to the components shown in FIG. 7, and the communication circuit 1160 may include a circuit for RF communication of various communication schemes (such as WiFi, 3G, LTE, Bluetooth, NFC, and Zigbee). Components that may be included in the computing device 10000 may be implemented by hardware, software, or a combination of both hardware and software which include at least one integrated circuit specialized in a signal processing or an application.

Methods according to embodiments of the present invention may be implemented in the form of program instructions to be executed through various computing devices so as to be recorded in a computer-readable medium. Particularly, a program according to the embodiment may be configured as a PC-based program or an application dedicated to a mobile terminal. The application to which the present invention is applied may be installed on a user terminal through a file provided by a file distribution system. For example, the file distribution system may include a file transmission unit (not shown) for transmitting the file according to a request of the user terminal.

The devices described above may be implemented by hardware components, software components, and/or a combination of hardware components and software components. For example, devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, in some cases, one processing device is used, however, those skilled in the art will appreciate that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. The Software and/or data may be permanently or temporarily embodied in any type of machine, component, physical device, virtual equipment, and computer storage medium or device, in order to be interpreted by the processor or to provide instructions or data to the processor. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms so as to be recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. Examples of computer-readable recording media include a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. Examples of program instructions include a high-level language code to be executed by a computer using an interpreter or the like, as well as a machine code generated by a compiler. The above hardware device may be configured to operate as at least one software module to perform the operations of the embodiments, and vise versa.

Although the above embodiments have been described with reference to the limited embodiments and drawings, however, it will be understood by those skilled in the art that various changes and modifications may be made from the above-mentioned description. For example, appropriate results may be achieved even though the described techniques may be performed in an order different from the described manner, and/or the described components such as system, structure, device, and circuit may be coupled or combined in a form different from the described manner, or replaced or substituted by other components or equivalents. Therefore, other implementations, other embodiments, and equivalents to the claims are also within the scope of the following claims.

What is claimed is:

1. A device risk-based trusted device verification and remote access processing system comprising a computing device including at least one processor and at least one memory storing a set of executable instructions, wherein the at least one processor, upon execution of the instructions, is configured to perform the following steps:

starting, when a remote access application installed on a user device is executed, a risk inspection process based on risk inspection information set in a device management server linked with the remote access application;

calculating a risk score for the user device based on the check result by performing vulnerability check process and an additional check process corresponding to inspection items based on the risk inspection information once the risk inspection process starts;

allowing the device management server to determine whether the user device is a trusted device based on the received risk score by transmitting, once a function of the risk score calculation has been completed and the risk score has been calculated, the calculated risk score to the device management server; and monitoring data transmission and reception in real time between the user device and a business server when the user device remotely accesses the business server linked with the remote access application while the device management server has registered the user device allowing the user device to remotely access the business server, once the user device has been identified as the trusted device, wherein the risk inspection information, as information generated by the device management server, includes information composed of vulnerability check items and additional check items including a plurality of pieces of inspection information for verifying whether the user device is a trusted device when the remote access application installed on the user device is executed; wherein the calculating the risk score for the user device includes:

starting a vulnerability check process for the user device when the risk inspection process starts;

completing, in response to when the vulnerability check process starts, the vulnerability check process for the user device by performing at least one of the following inspections: inspection on anti-virus installation, inspection on whether anti-virus is executed, inspection on latest security patches of anti-virus, inspection on latest security patches of an operating system, inspection on latest security patches of a work program, inspection on password stability, inspection on quarterly password change, inspection on screen saver settings, inspection on shared folder settings and inspection on USB auto-run permission, which are based on some of the pieces of inspection information included in the vulnerability check item based on the risk inspection information; and calculating scores for detailed inspections included in the vulnerability check item through a first check result based on the completed vulnerability check process when a function of the vulnerability check process is completely performed, thereby calculating a first risk score for a vulnerability of the user device by applying the calculated score to a preset risk score formula;

wherein the calculating the risk score includes:

starting an additional test process for the user device when the vulnerability check process is performed;

completing, in response to when the additional check process starts, an additional check process for the user device by performing at least one of the following inspections: inspection on whether an editing program is installed, inspection on whether a wireless LAN card is installed, inspection on whether a secure USB is installed, inspection on whether an unauthorized program is installed, inspection on web browser settings, inspection on firewall settings, inspection on user device account settings, inspection on port vulnerability, inspection on whether a security sensor is activated and inspection on whether an NTP server is synchronized, which are based on some of the pieces of inspection information included in the additional check item based on the risk inspection information; and calculating, in response to when a function of the additional check process is completely performed, scores for detailed inspections included in the additional check item through a second check result based on the completed additional check process, thereby calculating a second risk score for a function setting of the user device by applying the calculated score to the preset risk score formula;

wherein the determining whether the user device is a trusted device through the received risk score includes:

transmitting, when the calculating the risk score is completely performed and the first risk score and the second risk score are completely calculated, the first risk score and the second risk score to the device management server; and determining, when the device management server receives the first risk score and the second risk score and then the device management server determines a reliability level for the user device through the first risk score and the second risk score, whether the user device is a trusted device through the determined reliability level; and wherein the device management server is configured to perform the following steps:

confirming whether each of the first risk score and the second risk score is included in any one of preset reliability score ranges when the first risk score and the second risk score are received;

processor determining a reliability level of the user device as a trusted level upon confirming that both of the first risk score and the second risk score are included in the first score range among the preset reliability score ranges; and determining, upon confirming that each of the first risk score and the second risk score is included in at least one of a second score range or a third score range among the preset reliability score ranges, a reliability level of the user device as an intermediate level corresponding to the second score range or an untrusted level corresponding to the third score range.

2. The device risk-based trusted device verification and remote access processing system of claim 1, wherein, when the reliability level of the user device is determined to be the intermediate level, the device management server identifies detailed inspections less than a designated score among detailed inspections based on the vulnerability check process and detailed inspections based on the additional check process through history information based on the vulnerability check inspection process and the additional check process, and provides the user device with setting guide information for calculating the identified detailed inspections to have the designated score or higher so as to allow a user of the user device to change settings of the user device through the setting guide information, so that the reliability level of the user device is re-determined as the trusted level.

3. The device risk-based trusted device verification and remote access processing system of claim 2, wherein the monitoring data transmission and reception in real time between the user device and the business server includes:

determining the user device as a trusted device when the reliability level of the user device is determined as the trusted level from the device management server, thereby registering the user device to allow the user device to remotely access the business server; and providing a monitoring server with monitoring information obtained by monitoring data transmitted and received between the business server and the user device when the user device remotely accesses the business server while the determining the user device is completely performed.

* * * * *